(12) United States Patent
Tschudin

(10) Patent No.: US 11,002,578 B2
(45) Date of Patent: May 11, 2021

(54) MAGNETIC-INDUCTIVE FLOW METER WITH ELECTRODES HAVING ANNULAR EDGE REGIONS

(71) Applicant: Endress+Hauser Flowtec AG, Reinach (CH)

(72) Inventor: Beat Tschudin, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/628,780

(22) PCT Filed: Jun. 19, 2018

(86) PCT No.: PCT/EP2018/066256
§ 371 (c)(1),
(2) Date: Jan. 6, 2020

(87) PCT Pub. No.: WO2019/007671
PCT Pub. Date: Jan. 10, 2019

(65) Prior Publication Data
US 2020/0141774 A1    May 7, 2020

(30) Foreign Application Priority Data

Jul. 6, 2017   (DE) .................... 10 2017 115 149.4

(51) Int. Cl.
*G01F 1/58*    (2006.01)
(52) U.S. Cl.
CPC .............. *G01F 1/588* (2013.01); *G01F 1/584* (2013.01)

(58) Field of Classification Search
None
See application file for complete search history.

(56) References Cited

U.S. PATENT DOCUMENTS

| 4,567,775 A | 2/1986 | Schmoock | |
|---|---|---|---|
| 2011/0113895 A1* | 5/2011 | Kerrom | G01F 15/14 73/861.12 |
| 2013/0086993 A1* | 4/2013 | Kerrom | G01F 1/584 73/861.12 |

(Continued)

FOREIGN PATENT DOCUMENTS

| DE | 202008017789 U1 | 7/2010 |
|---|---|---|
| DE | 102010030229 A1 | 12/2011 |
| DE | 202015103218 U1 | 8/2015 |

*Primary Examiner* — Harshad R Patel
(74) *Attorney, Agent, or Firm* — Christopher R. Powers; Endress+Hauser (USA) Holding Inc.

(57) ABSTRACT

A magnetic-inductive flow measuring device includes measuring electrodes, each having an end face including a planar annular edge region surrounding a center region, each annular edge region configured to seat against a sealing surface of an inner mold such that the center region of the end face does not contact the inner mold during the injection molding of a measuring tube body. A method for manufacturing the magnetic-inductive flow measuring device includes steps of providing and positioning an inner mold, an outer mold and two measuring electrodes, where each annular edge region of each measuring electrode seats against its corresponding sealing surface of the inner mold such that the center region of the measuring electrode protrudes into the corresponding recess of the inner mold without contacting the inner mold.

10 Claims, 7 Drawing Sheets

(56) References Cited

U.S. PATENT DOCUMENTS

2014/0083200 A1 3/2014 Rogers et al.
2015/0241260 A1* 8/2015 Voigt .................... G01F 1/584
340/612

* cited by examiner

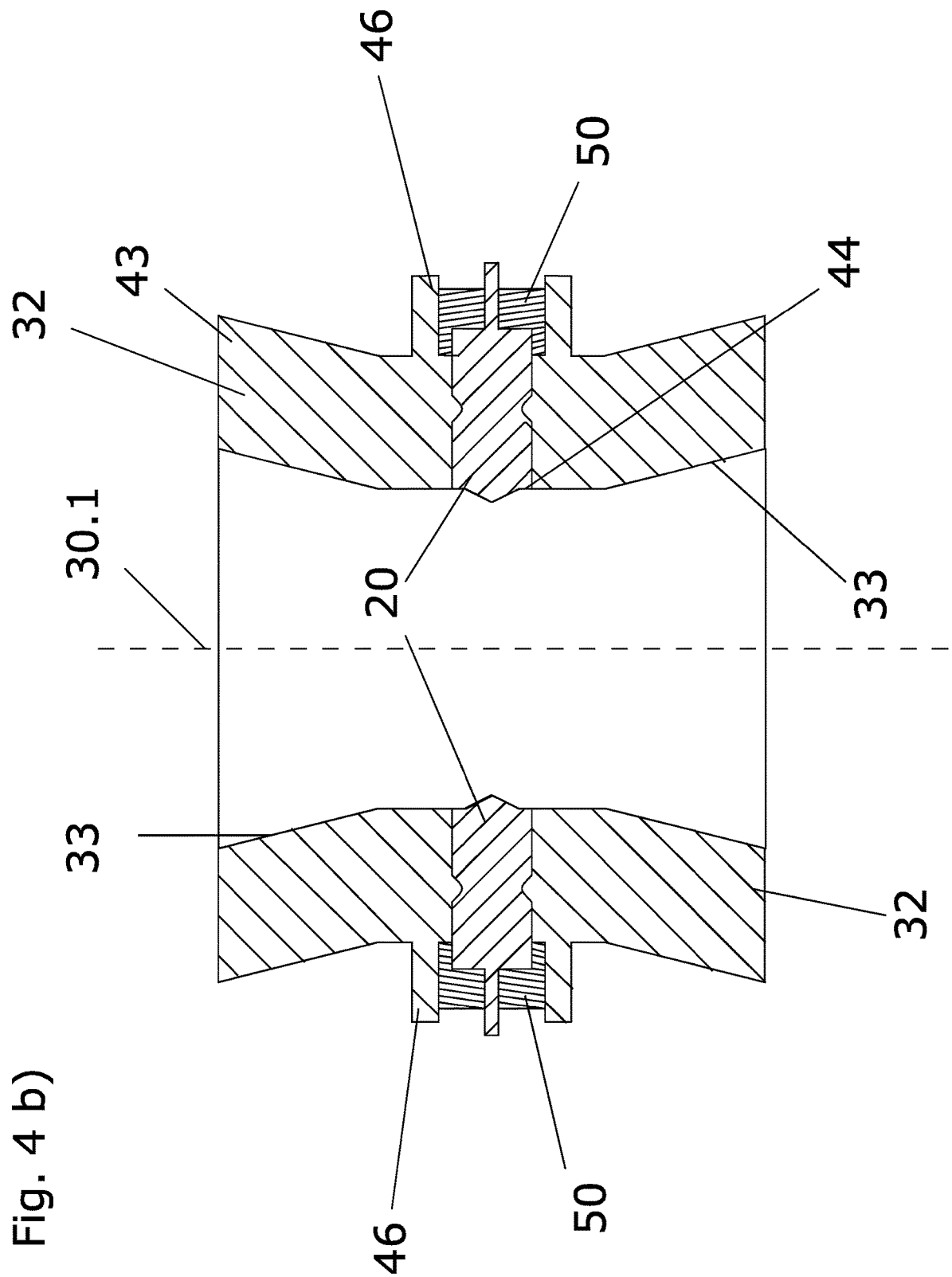

MAGNETIC-INDUCTIVE FLOW METER WITH ELECTRODES HAVING ANNULAR EDGE REGIONS

CROSS-REFERENCE TO RELATED APPLICATIONS

The present application is related to and claims the priority benefit of German Patent Application No. 10 2017 115 149.4, filed on Jul. 6, 2017, and International Patent Application No. PCT/EP2018/066256 filed on Jun. 19, 2018, the entire contents of which are incorporated herein by reference.

TECHNICAL FIELD

The invention relates to a method for manufacturing a magnetic-inductive flow measuring device for measuring volume flow, or flow velocity, of a medium flowing through a measuring tube, as well as relating to such a flow measuring device.

BACKGROUND

The magnetic-inductive measuring principle has been used for a long time for flow measurements, wherein corresponding magnetic-inductive flow measuring devices have already undergone a large number of improvements and further developments. Depending on field of use of the magnetic-inductive flow measuring devices, the manufacturing process of these flow measuring devices can vary. For cost effective flow measuring devices, it has been found to be advantageous to manufacture a measuring tube of a magnetic-inductive flow measuring device by an injection molding method, wherein measuring electrodes of the flow measuring device are embedded in the cast material during the injection molding; see, for example, Disclosure document DE 202008017789 U1. Problematic in the case of such flow measuring devices are the transitions between measuring tube and measuring electrodes on a measuring tube inner wall, since the injection molds must be very precise at the position of the measuring electrodes, in order to assure a clean transition. Otherwise, injection molded material can partially cover the measuring electrodes in the region of the measuring tube inner wall or form a ledge in an edge region of the measuring electrodes, or a gap in the measuring tube lumen, either of which disturbs the flow of a medium in the measuring tube.

SUMMARY

An object of the invention is, consequently, to provide a method for manufacturing a magnetic-inductive flow measuring device as well as a magnetic-inductive flow measuring device, in the case of which the disadvantages of the state of the art are prevented.

The object is achieved by a method as defined herein for manufacturing a magnetic-inductive flow measuring device as well as by a magnetic-inductive flow measuring device with electrodes having annular edge regions.

A method of the invention for manufacturing a magnetic-inductive flow measuring device includes method steps as follows:

providing and positioning an inner mold and an outer mold as well as two measuring electrodes in a first method step, wherein an annular lumen is formed between the inner mold and the outer mold, wherein the annular lumen has an annular lumen axis, wherein the inner mold has at least two oppositely facing, circularly shaped, sealing surfaces, each of which surrounds a recess, wherein the surface normals of the sealing surfaces extend in opposed directions perpendicularly to the annular lumen axis, wherein the measuring electrodes have, in each case, an electrode shaft and an end face directed toward the annular lumen axis and having an annular edge region and a center region surrounded by the edge region, wherein the two measuring electrodes are held, in each case, by the outer mold in such a manner that the electrode shafts pass through the annular lumen, in each case, in the direction of one of the surface normals, and wherein each of the annular edge regions contacts its one of the annular sealing surfaces;

filling the annular lumen with a synthetic material forming a measuring tube body of the measuring tube by injection molding;

allowing the synthetic material to harden or hardening the synthetic material; and removing the inner mold and the outer mold.

The terminology, "removing the inner mold and the outer mold", is not intended to limit which is done first. Either the inner mold or the outer mold can be removed first, or they can both be removed at the same time.

The injection molding can be, for example, a thermoplastic injection molding or a thermosetting plastic injection molding.

The synthetic material comprises, in such case, advantageously at least one of the following materials: polyetheretherketone (PDEK), polyphenylene sulfide (PPS), polyphthalamide (PPA), polyamide (PA). Especially, the synthetic material is resistant to high temperatures.

In an embodiment of the method, the sealing surfaces as well as the annular edge regions are planar.

In an embodiment of the method, the inner mold includes a first inner part and a second inner part, wherein the providing of the inner mold comprises a bringing of the first inner part and the second inner part together, wherein a first part of the recess belongs to the first inner part and a second part of the recess belongs to the second inner part.

In an embodiment of the method, the outer mold includes a first outer part and a second outer part, wherein the providing of the outer mold comprises a bringing of the first outer part and the second outer part together, wherein the outer mold has sockets (42.3) for each of the measuring electrodes, wherein, in each case, a first part of the socket belongs to the first outer part, and a second part of the socket belongs to the second outer part.

In an embodiment of the method, the sockets of the outer mold grip around each of the measuring electrodes injection molding tightly at an end of the measuring electrodes far from the annular lumen.

A magnetic-inductive flow measuring device of the invention for measuring volume flow, or flow velocity, of a medium flowing through a measuring tube comprises:

a measuring tube to convey the medium, which measuring tube is manufactured according to a method of the invention, wherein the measuring tube has a measuring tube axis;

a magnet system having at least one coil system for producing a magnetic field, which extends perpendicularly to the measuring tube axis;

a pair of measuring electrodes arranged at least partially in the measuring tube for registering an electrical voltage induced in the medium by the magnetic field, which electrical voltage depends on the flow, or velocity, of the medium as well as on strength as well as orientation of the magnetic field, wherein the measuring electrodes contact the medium;

an electronic measuring/operating circuit for operating the magnet system and the measuring electrodes, as well as for determining and outputting a measured variable representing the flow, wherein the measuring tube has a conveying lumen extending along the measuring tube axis, which conveying lumen is formed during the injection molding by covering of the inner mold with a synthetic material, wherein each measuring electrode has an end face facing the measuring tube axis as well as a measuring electrode lateral surface, wherein the measuring electrodes are held in position during the injection molding relative to the inner mold, wherein the measuring electrodes are embedded in the measuring tube by the injection molding of the measuring tube, wherein the end face has an annular edge region and a center region surrounded by the edge region.

In an embodiment of the magnetic-inductive flow measuring device, the edge region of the measuring electrode is flush with a wall of the conveying lumen.

In an embodiment of the magnetic-inductive flow measuring device, a first side of the measuring electrode lateral surface toward the end face is surrounded tightly by a measuring tube wall.

In an embodiment of the magnetic-inductive flow measuring device, the measuring electrode includes in the region of the first side at least one groove or at least one bulge for anchoring in the measuring tube.

In an embodiment of the magnetic-inductive flow measuring device, the measuring electrode has a longitudinal axis intersecting the end face, wherein the groove, or bulge, is arranged radially symmetrically around the longitudinal axis.

In an embodiment of the magnetic-inductive flow measuring device, the measuring tube includes on an outside for each measuring electrode a circularly shaped protrusion, which protrusion is adapted at least sectionally to surround the measuring electrode at a measuring tube axis far, second end of the measuring electrode, wherein the measuring electrode is spaced from the protrusion in the region of the second end.

In an embodiment of the magnetic-inductive flow measuring device, the magnetic-inductive flow measuring device includes for each measuring electrode a seal, which is pressed into the spacing.

In an embodiment of the magnetic-inductive flow measuring device, a coefficient of thermal expansion of the measuring tube differs from a coefficient of thermal expansion of the measuring electrode by less than 30% and especially less than 20%.

In an embodiment, the measuring electrode includes on an end-face far side an electrode shaft or an electrode socket.

BRIEF DESCRIPTION OF THE DRAWINGS

The invention will now be described based on examples of embodiments presented in the appended drawing, the figures of which show as follows.

DETAILED DESCRIPTION

Figure 1:
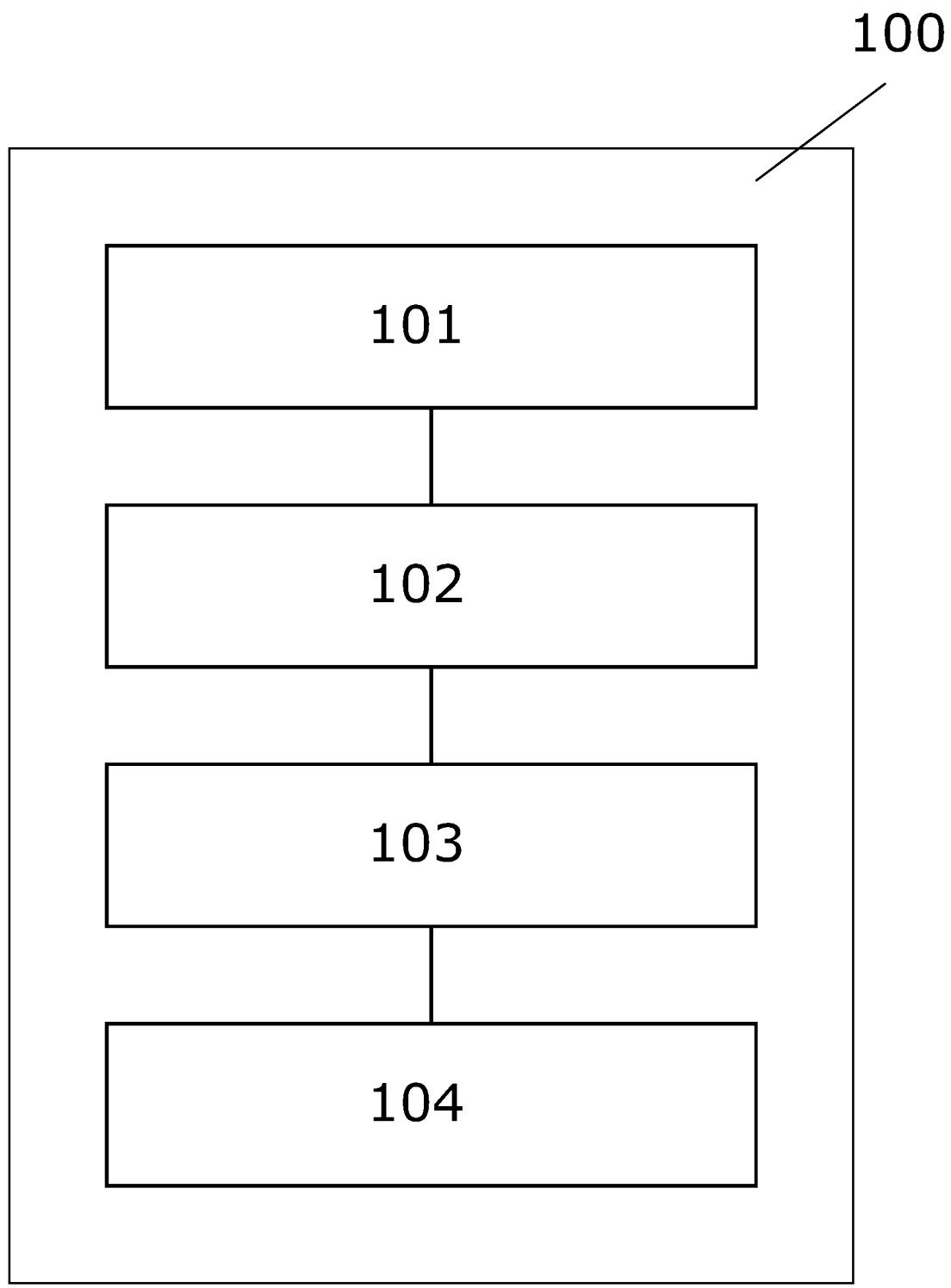
FIG. 1 shows method steps of a variant of a method of the present disclosure.

FIG. 1 shows the method steps of a variant of a method 100 of the invention for manufacturing a measuring tube of a magnetic-inductive flow measuring device, wherein in a first method step 101 an inner mold 41 and an outer mold 42 as well as two measuring electrodes 20 are provided and positioned. The positioning of the molds and the measuring electrodes leads to a forming of an annular lumen 43 with an annular lumen axis; see FIGS. 3 a) and 4 a). The inner mold 41 includes, in such case, two oppositely facing recesses 45, each of which is surrounded by a sealing surface 44, wherein the surface normals of the sealing surfaces extend in opposed directions perpendicularly to the annular lumen axis.

The measuring electrodes 20 have, in each case, an electrode shaft 24 and an end face 21 facing toward the annular lumen axis, wherein the end face has an annular edge region 21.2 and a center region 21.1 surrounded by the edge region, wherein the two measuring electrodes 20 are held by the outer mold, in each case, in such a manner that the electrode shafts 24 pass through the annular lumen, in each case, in the direction of one of the surface normals, and the annular edge regions 21.2, in each case, contact one of the annular sealing surfaces. The central regions 21.1 extend, in such case, into the recesses 45, without contacting the inner mold 41. The arranging of electrodes with the end faces with edge region and corresponding recess with sealing surface surrounding the recess assures a closing off of the central region 21.1 of the end face.

In a second method step 102, the annular lumen is filled by injection molding with a synthetic material forming a measuring tube body of the measuring tube. Because of the closing off of the central regions 21.1 of the end faces 21 of the measuring electrodes 20, the synthetic material does not reach the central regions. Furthermore, the center region remains unloaded by a compressive pressure between mold and measuring electrode during the injection molding.

In a third method step 103, the synthetic material is caused to harden.

In a fourth method step 104, the molds are removed.

Figure 2:
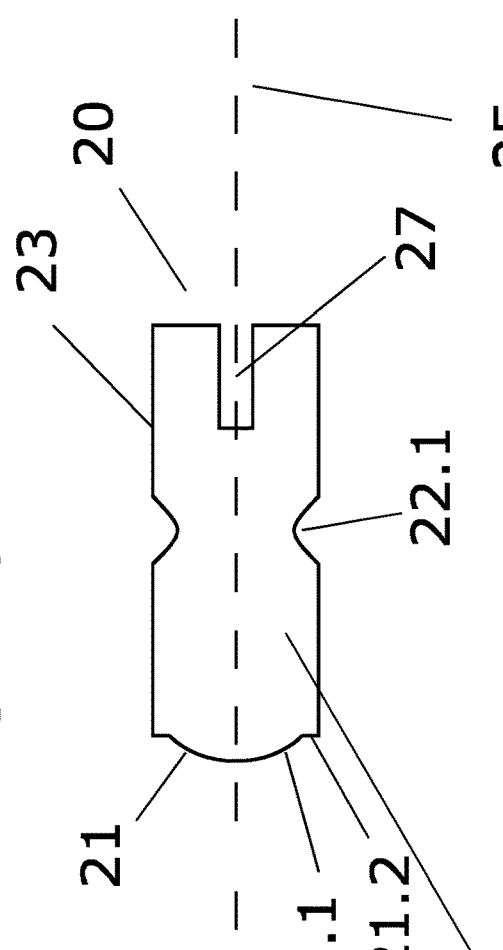
FIGS. 2a-2d show contours of electrodes of a magnetic-inductive flow measuring device of the present disclosure.
Figure 2:
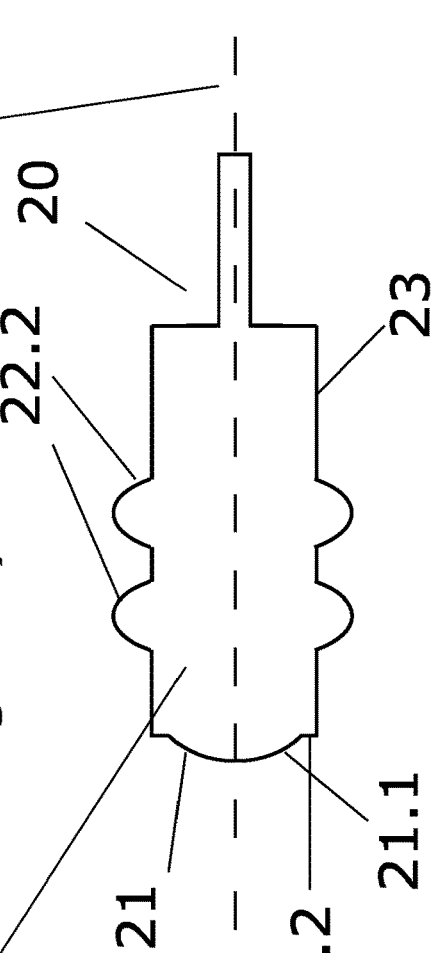
Figure 2:
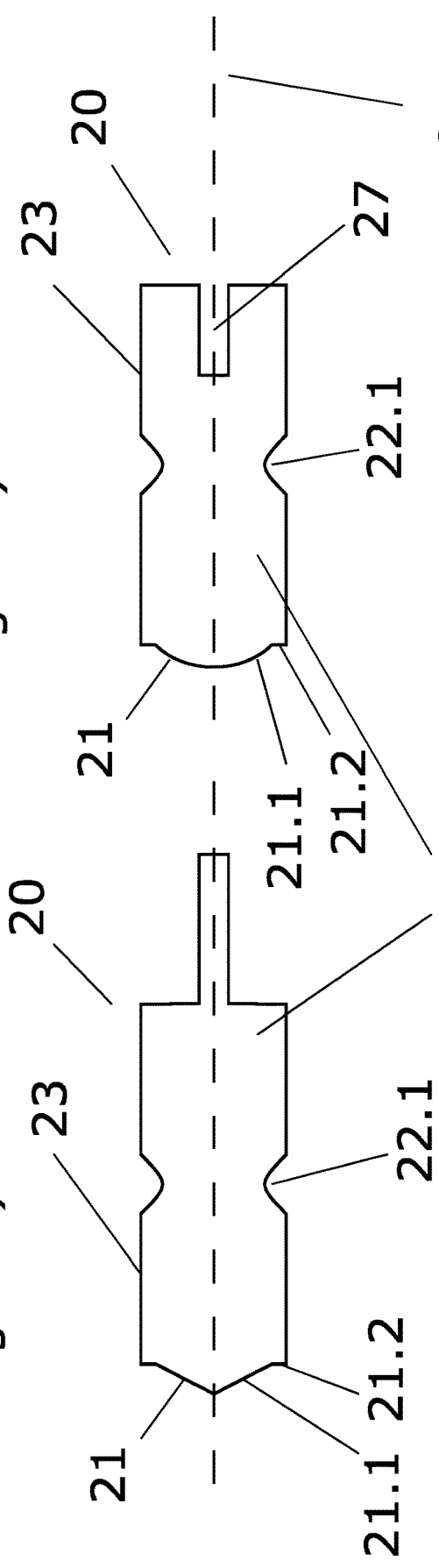
Figure 2:
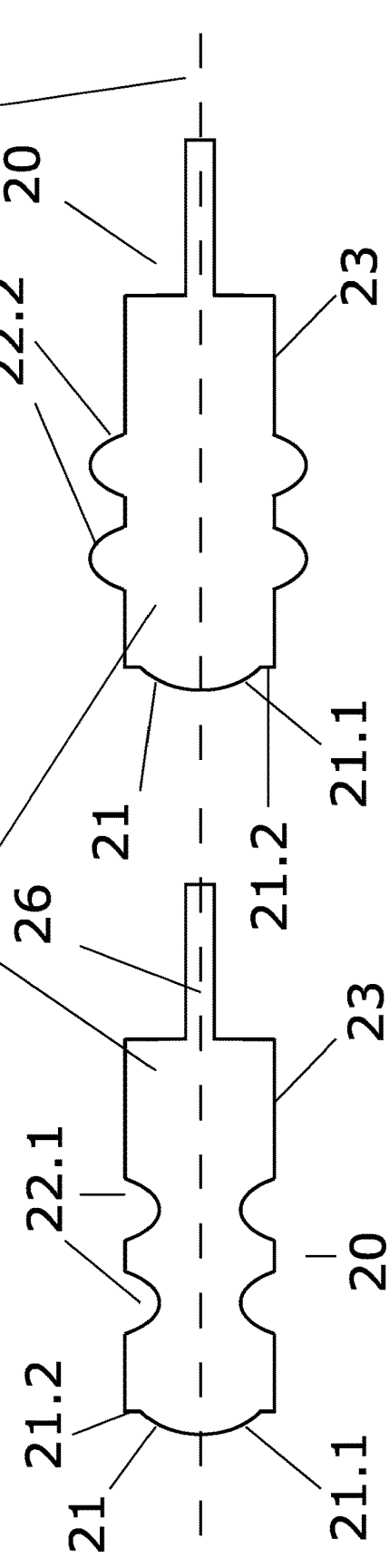

FIGS. 2 a) to 2 d) sketch contours of various examples of measuring electrodes of a magnetic-inductive flow measuring device of the invention, wherein the measuring electrodes 20 have, in each case, an electrode shaft 24 with a measuring electrode lateral surface 23 and an end face 21. The end face 21 includes a center region 21.1 as well as an edge region 21.2, wherein the center region can be, for example, conical (FIG. 2 *a*)) or, for example, circular segment shaped (FIGS. 2 *b*) to 2 *d*)). The edge region 21.2 is, in such case, preferably perpendicular to a longitudinal axis 25 of the measuring electrode. The measuring electrode 20 includes at least one groove 22.1 (FIGS. 2 *a*) to *c*)) or at least one bulge 22.2 (FIG. 2 *d*)). A measuring electrode can also have at least one groove as well as at least one bulge. The at least one bulge 22.2, and/or the at least one groove 22.1, assure a safe holding, and, thus, a stable position, of the measuring electrode in the measuring tube. Instead of an electrode pin 26 of the electrode for contacting the measuring electrode with an electrical connecting line at an end opposite the end face 21, the measuring electrode can also have an electrode socket 27, into which a pin is introduced by means of press fit; see FIG. 2 *b*). Such is advantageous in the case of measuring electrode materials, in the case of which a connection of such a connecting line per soldering is difficult to assure due to material properties.

Figure 3:
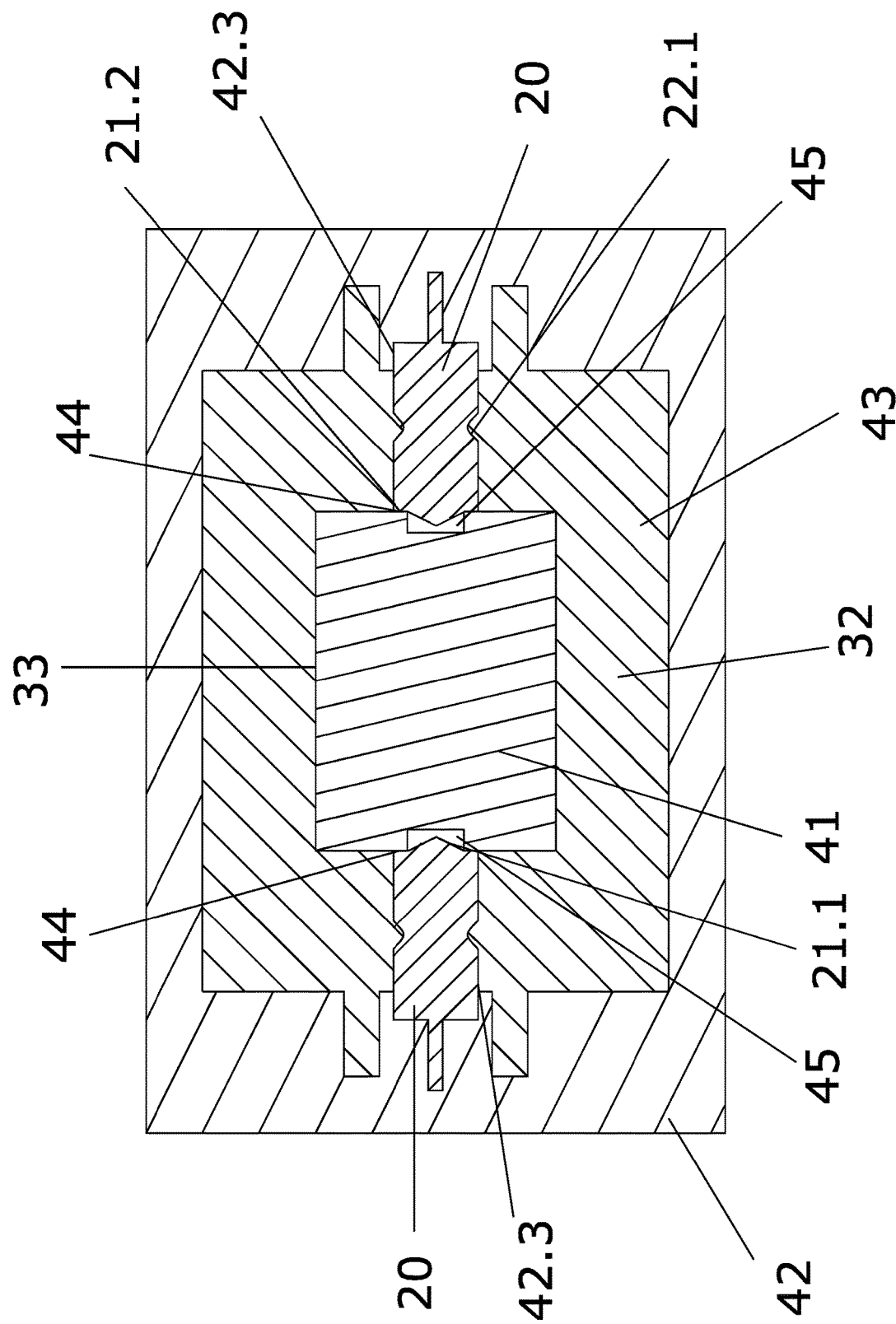
FIG. 3a shows a cross-section through positioned molds according to a variant of the method of the present disclosure.
FIG. 3b shows a cross-section of a magnetic-inductive flow measuring device of the present disclosure.
Figure 3:
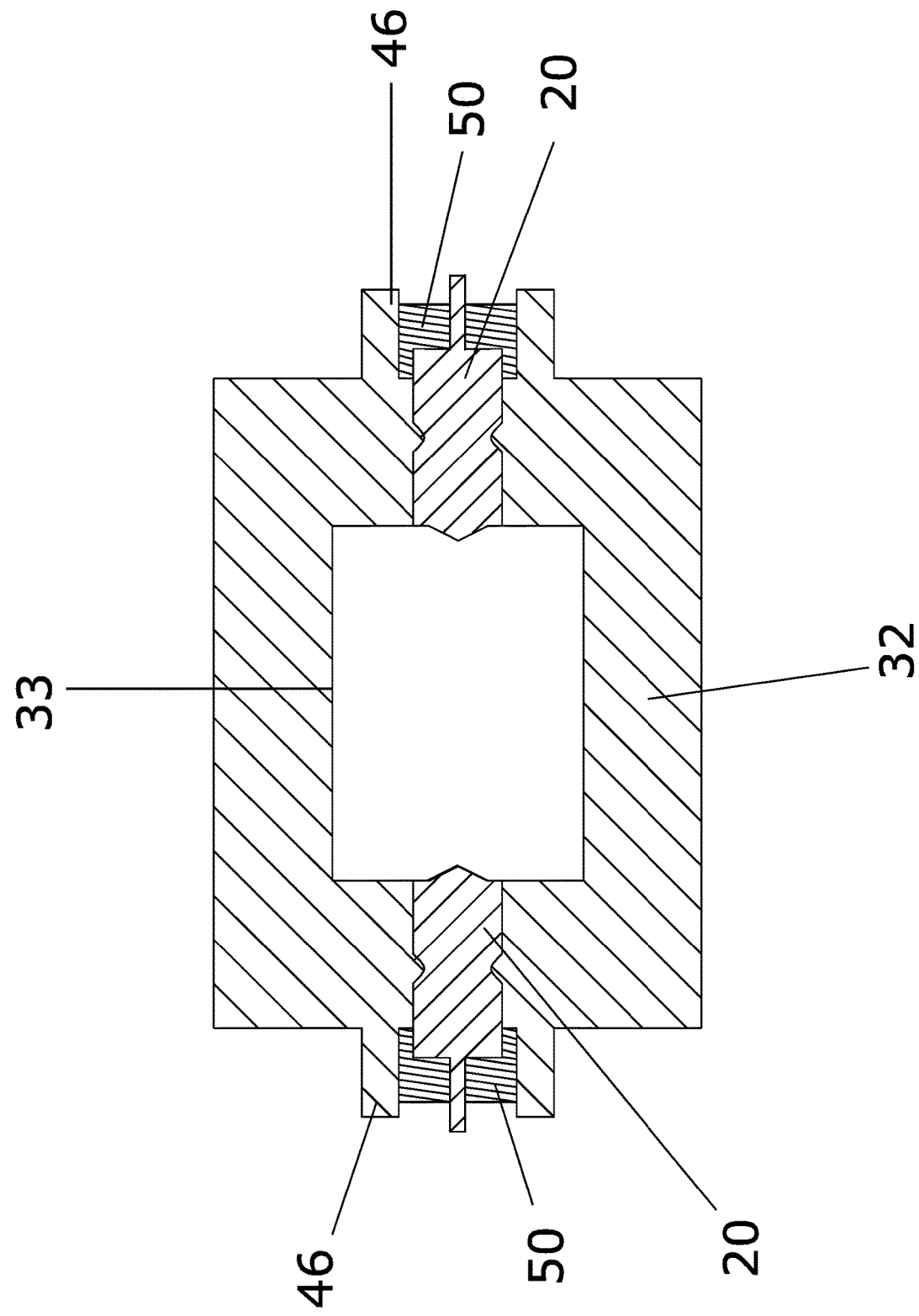

FIG. 3 *a*) shows a cross-section of a provided inner mold 41, outer mold 42 and electrodes 20 during the hardening of a synthetic material provided in the annular lumen 43 according to the third method step of the method of the invention. The electrodes lie by means of their edge regions 21.2, in each case, on a sealing surface 44 of the inner mold, such that the central regions 21.1 of the measuring electrodes 20 are spaced from the inner mold 41. The measuring electrodes are held during the injection molding by the outer mold by means of a socket 42.3 of the outer mold 42 and by the inner mold by means of the sealing surfaces 44, wherein a first side of the measuring electrode lateral surface 23 toward the end face 21 is surrounded by synthetic material, wherein the first side has at least one bulge 22.2, or at least one groove 22.1, such as shown in FIGS. 2 *a*) to *d*). After hardening of the synthetic material, the groove, or the bulge, assures a fixed seating of the electrode in the synthetic material, and, thus, in the measuring tube.

FIG. 3 *b*) shows the cross-section corresponding to FIG. 3 *a*) of an example of a magnetic-inductive flow measuring device of the invention with a measuring tube 30 after hardening of the synthetic material and removal of the molds, wherein the hardened synthetic material forms the measuring tube wall 32 of the magnetic-inductive flow measuring device. The measuring tube includes in the region of the electrodes, in each case, a circularly shaped protrusion 46, which sectionally surrounds the measuring electrode 20 at a measuring tube axis far, second end of the measuring electrode, wherein the measuring electrode is spaced from the protrusion in the region of the second end. A seal 50 is inserted in an intermediate region between protrusion 46 and the measuring electrode 20, in order to assure a sealing of the magnetic-inductive flow measuring device especially in the case of high media pressures and/or variable media temperatures. Different coefficients of thermal expansion of measuring tube wall 32 and measuring electrodes 20 can in the case of temperature fluctuations bring about a decreasing state of sealing of a boundary between measuring electrode and measuring tube.

Figure 4:
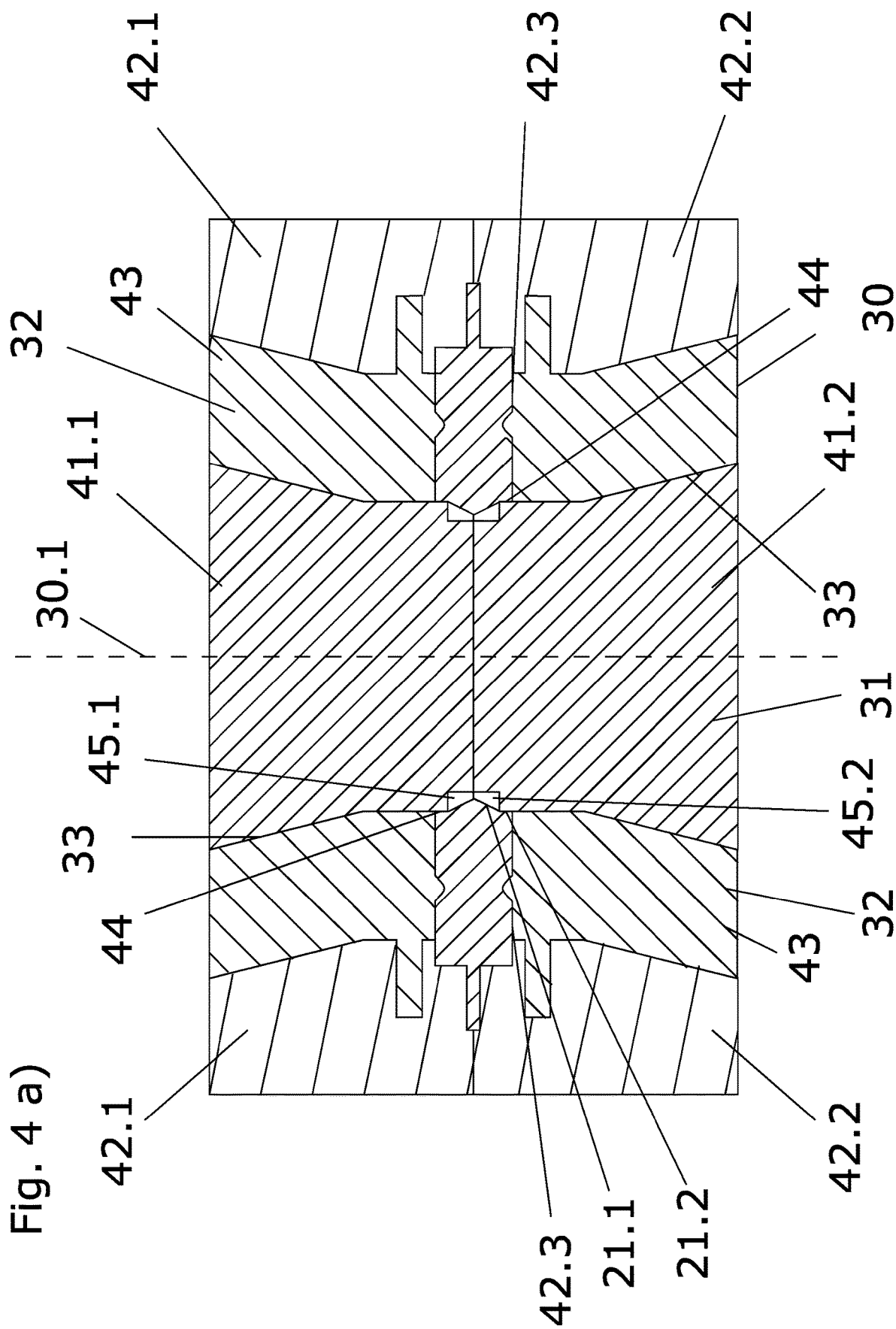
FIG. 4a shows a longitudinal section through positioned molds according to a variant of the method of the present disclosure.
FIG. 4b shows part of a longitudinal section of a magnetic-inductive flow measuring device of the present disclosure.

FIG. 4 *a*) shows a longitudinal section of FIG. 3 *a*) through a provided inner mold 41, outer mold 42 and electrodes 20 during the hardening of a synthetic material cast in the annular lumen 43, wherein the inner mold 41 has a first inner part 41.1 as well as a second inner part 41.2, and wherein the outer mold 42 has a first outer part 42.1 and a second outer part 42.2. A positioning of the molds includes a bringing together of the first inner part and the second inner part as well as the first outer part and the second outer part as well as a positioning of the measuring electrodes after positioning of the inner mold. The inner parts are led together along a measuring tube axis 30.1 defined by the measuring tube to be manufactured, wherein the first inner part has a first part of the recess 45.1, and wherein the second inner part has a second part of the recess 45.2, which after the bringing together of the inner parts form the recess 45. In this way, it is possible to embed in the measuring tube measuring electrodes, which protrude into the lumen 31 conveying the medium. The dividing of the outer mold into first and second outer parts enables integrating the measuring electrodes at least partially into the outer mold, in order to hold the measuring electrodes, as well as enabling removing the outer mold without having to move the measuring electrodes.

FIG. 4 *b*) shows a portion of a longitudinal section corresponding to the cross-section shown in FIG. 3 *b*) of an example of a magnetic-inductive flow measuring device of the invention with a measuring tube 30 after hardening of the synthetic material and removal of the molds, wherein the hardened synthetic material of the measuring tube 30 forms the magnetic-inductive flow measuring device, wherein, such as already shown in FIG. 3 *b*), a seal 50 is introduced in the protrusion partially surrounding the measuring electrode. The measuring tube can, such as shown in this example of an embodiment, have a measuring tube diameter varying in the direction of the measuring tube axis. The measuring tube diameter can, however, also be constant in the direction of the measuring tube axis.

Figure 5:
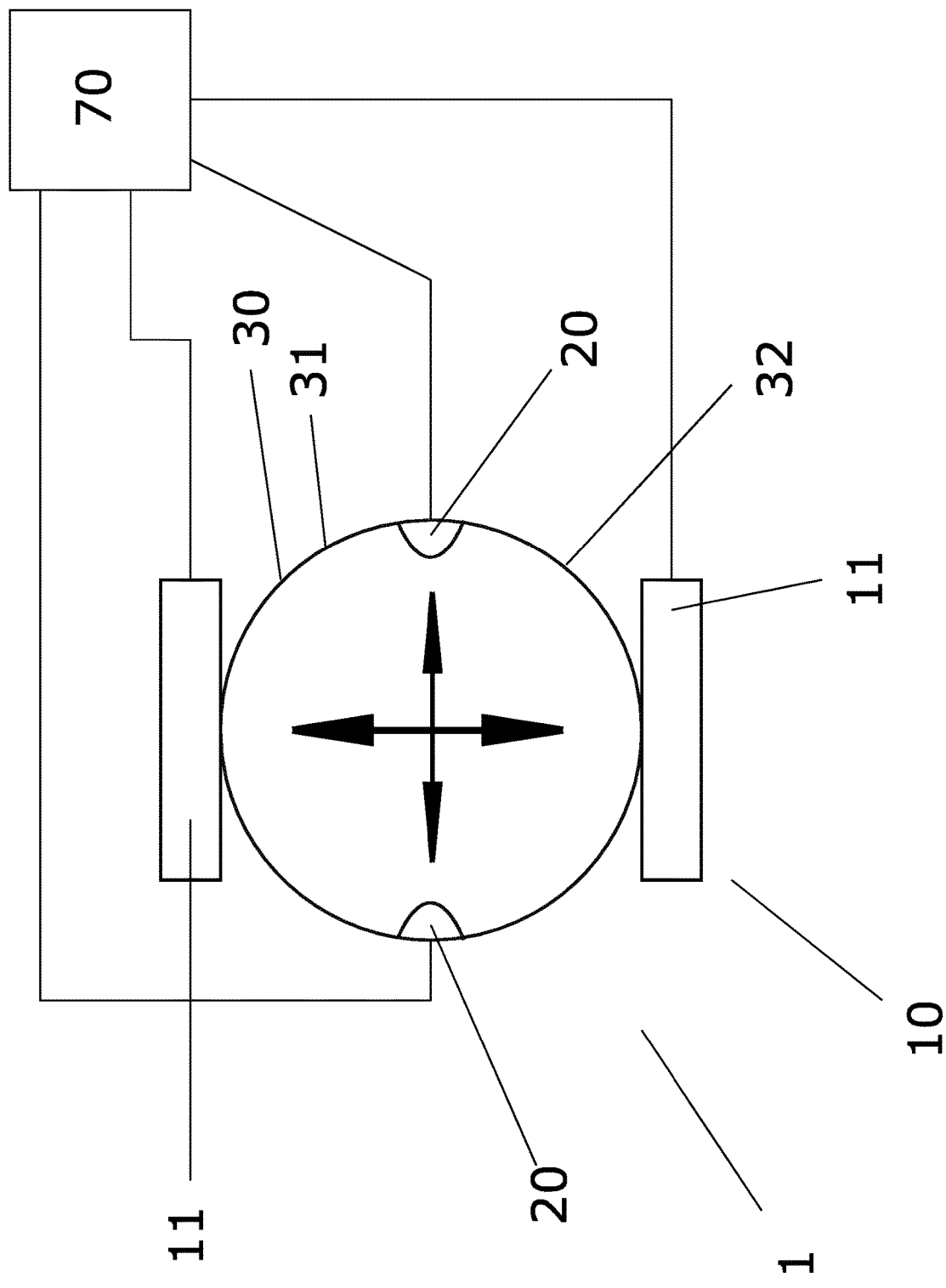
FIG. 5 shows schematically, the construction of an example of a magnetic-inductive flow measuring device of the present disclosure.

FIG. 5 shows schematically the construction of a magnetic-inductive flow measuring device 1, which has a measuring tube 30 with a measuring tube wall 32, which forms a conveying lumen 31 for conveying a medium. A magnet system 10 with two coil systems is adapted to establish a magnetic field (vertical arrows) extending perpendicularly to a measuring tube axis, in order to induce in the medium a flow dependent as well as magnetic field dependent electrical voltage (horizontal arrows) extending perpendicularly to the magnetic field. Two measuring electrodes 20 are adapted to register the electrical voltage. An electronic measuring/operating circuit 70 evaluates the electrical voltage as a flow dependent measured variable and operates the magnet system 10.

The invention claimed is:

1. A magnetic-inductive flow measuring device for measuring volume flow or flow velocity of a medium flowing through a measuring tube, the device comprising:
   the measuring tube configured to convey the medium, the measuring tube having a measuring tube axis;
   a magnet system including at least one coil system configured for generating a magnetic field extending perpendicular to the measuring tube axis;
   a pair of measuring electrodes arranged at least partially in the measuring tube and configured to register an electrical voltage induced in the medium by the magnetic field, the electrical voltage of which depends on the flow of the medium and on the strength and orientation of the magnetic field, wherein the measuring electrodes contact the medium; and
   an electronic measuring/operating circuit configured to operate the magnet system and the measuring electrodes and to determine and output a measured variable representing the flow,
   wherein the measuring tube includes a conveying lumen extending along the measuring tube axis, the conveying lumen defined by a wall of the measuring tube formed by an injection molding operation using an inner mold, wherein each measuring electrode includes a longitudinal axis, an end face facing the measuring tube axis and a lateral surface, and wherein each end face has a planar annular edge area and a center region surrounded by the planar annular edge area, the planar annular edge area extending from a peripheral edge of the end face to the center region, the peripheral edge defined by an intersection of the end face and the lateral surface, wherein each planar annular edge area is perpendicular to the longitudinal axis of its respective measuring electrode and is configured to seat against a sealing surface of the inner mold such that the center region of the end face does not contact the inner mold during the injection molding operation.

2. The device of claim 1, wherein the planar annular edge area of each measuring electrode is flush with an interior surface of the wall of the measuring tube.

3. The device of claim 1, wherein a first side of each measuring electrode lateral surface toward the end face is surrounded tightly by the wall of the measuring tube.

4. The device of claim 3, wherein each measuring electrode includes in its measuring electrode lateral surface at least one groove or at least one bulge configured to anchor in the measuring tube.

5. The device of claim 4, wherein each measuring electrode has a longitudinal axis intersecting the end face, wherein the at least one groove or at least one bulge is arranged radially symmetrically around the longitudinal axis.

6. The device of claim 1, wherein the measuring tube includes for each measuring electrode a circular shaped protrusion on an outside of the measuring tube, the protrusion configured, at least sectionally, to surround the measuring electrode at a second end of the measuring electrode opposite the end face, wherein the measuring electrode is spaced from the protrusion at the second end.

7. The device of claim 6, the device further comprising, for each measuring electrode, a seal disposed at least partially in the space between the measuring electrode and the protrusion.

8. The device of claim 1, wherein a coefficient of thermal expansion of the measuring tube differs from a coefficient of thermal expansion of each measuring electrode by less than 30%.

9. The device of claim 1, wherein a coefficient of thermal expansion of the measuring tube differs from a coefficient of thermal expansion of each measuring electrode by less than 20%.

10. The device of claim 1, wherein each measuring electrode includes an electrode pin or an electrode socket extending from a second end of the measuring electrode opposite the end face.

* * * * *